United States Patent [19]

Shull

[11] 4,313,103
[45] Jan. 26, 1982

[54] DIGITAL DEMODULATOR

[75] Inventor: Thomas A. Shull, Newport News, Va.

[73] Assignee: The United States of America as represented by the Administrator of the National Aeronautics and Space Administration, Washington, D.C.

[21] Appl. No.: 171,928

[22] Filed: Jul. 18, 1980

[51] Int. Cl.³ ............................................. H03K 13/24
[52] U.S. Cl. ............................................. 340/347 DD
[58] Field of Search ................ 340/347 DD; 329/110, 329/126, 104; 375/84, 82

[56] References Cited

U.S. PATENT DOCUMENTS 3,047,853  7/1962  Machol ....................... 340/347 DD
3,970,945  7/1976  Knapp ................................. 375/83

Primary Examiner—Charles D. Miller
Attorney, Agent, or Firm—Howard J. Osborn; John R. Manning; William H. King

[57] ABSTRACT

A digital demodulator for converting PCM data from PSK to NRZ-L and to Biφ-L. The demodulator is composed of standard integrated logic circuits. The key to the demodulation function is a pair of cross-coupled one-shot multivibrators 11 and 12 which with a flip-flop 13 produce the NRZ-L. In order to generate Biφ-L, the PSK carrier is constrained to be $2^N$ times the data bit rate. If NRZ-L is all that is required, the circuitry is greatly simplified and the $2^N$ times bit rate constraint can be removed from the carrier. A flip-flop 15, an OR gate 14, and AND gate 16 and a binary counter 17 generate the bit rate clock BTCK for the NRZ-L. The remainder of the circuitry is for converting the NRZ-L and BTCK into Biφ-L.

7 Claims, 2 Drawing Figures

DIGITAL DEMODULATOR

ORIGIN OF THE INVENTION

The invention described herein was made by an employee of the U.S. Government and may be manufactured and used by or for the Government for governmental purposes without the payment of any royalties thereon or therefor.

BACKGROUND OF THE INVENTION

The invention relates to a digital demodulator and more specifically concerns a digital demodulator that will convert pulse code modulated (PCM) data from phase-shift-key (PSK) to non-return-to-zero (NRZ-L) and bi-phase (Bi$\phi$-L) data.

One of the experiments being developed by the National Aeronautics and Space Administration for the Long Duration Exposure Facility is the Shuttle Bay Environment Measurements. The data gathered by this experiment is pulse code modulated for recording on magnetic tape. During different data-taking periods, the recorder is run at different speeds. In order to be compatible with the changing bandwidth of the recorder, the data is allowed to digitally phase shift key a square wave carrier having three selectable frequencies. To test the SBEM experiment, a PCM demodulator is needed to convert the data from PSK to Bi$\phi$-L for decommutation and display.

It is therefore an object of this invention to provide a simple, inexpensive digital demodulator for converting pulse code modulated data from PSK to Bi$\phi$-L.

Another object of this invention is to provide a digital demodulator for converting pulse code modulated data from PSK to NRZ-L.

Other objects and advantages of this invention will become apparent hereinafter in the specification and drawings.

SUMMARY OF THE INVENTION

A pair of one-shot (monostable) multivibrators and a flip-flop perform the PSK to NRZ-L demodulation function. The one-shot multivibrators are connected to the PSK input, one triggering on rising edges and the other on falling edges of the input. The one-shot multivibrator output pulse widths are set to three-fourths of the expected carrier period and are cross-coupled through their reset inputs so that if an input transition causes either one-shot multivibrator to pulse, a transition one-half a period later is ignored. By detecting which one-shot multivibrator is pulsed, the value of the data bit is determined. The outputs of the two multivibrators are connected to the set and reset inputs of the flip-flop for this purpose. The output of the flip-flop is the NRZ-L representation of the data contained within the input signal. The remainder of the circuit is used to generate a clock to go with the NRZ-L data and then to convert the NRZ-L data to Bi$\phi$-L data.

DETAILED DESCRIPTION OF THE INVENTION

Figure 1:
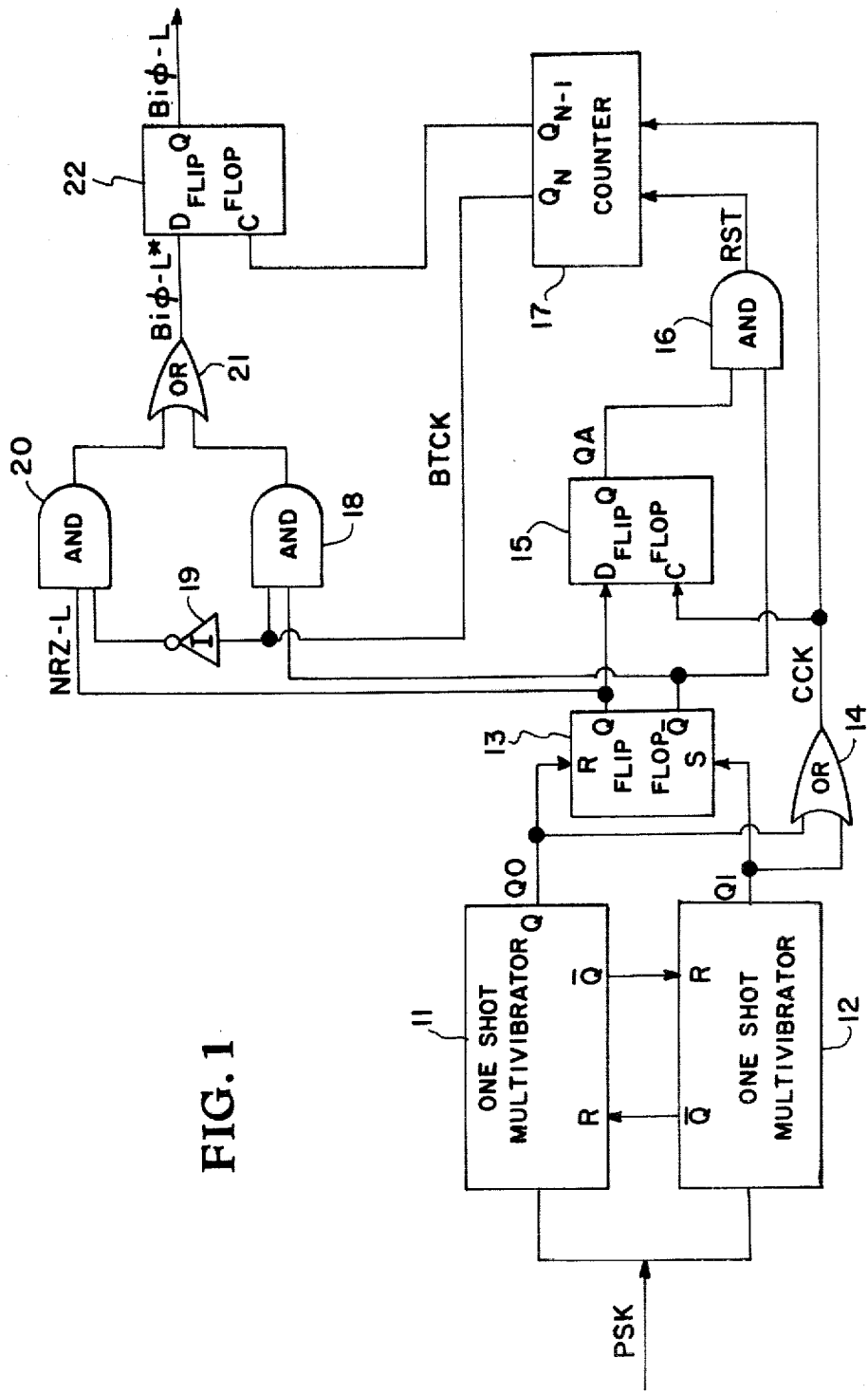
FIG. 1 is a block diagram of the invention in which the carrier of the PSK input signal is $2^N$ times the bit rate.

Turning now to the embodiment of the invention selected for illustration in the drawings, the numbers 11 and 12 designate one-shot multivibrators which receive the PSK input signal. Multivibrator 11 is triggered on the rising edges and multivibrator 12 is triggered on the falling edges of the PSK input signal. The output pulse widths of multivibrators 11 and 12 are set to three-fourths of the expected carrier period of the PSK input signal. The inverted normal outputs Q of multivibrators 11 and 12 are connected to the resets R of multivibrators 12 and 11, respectively. With this cross-coupling between the two multivibrators, if an input transition causes either multivibrator to pulse, a transition one-half period later is ignored. For a "one-zero" or "zero-one" bit pattern there is no transition at the data bit edge. This allows enough time (a whole period) to pass so that the pulsing multivibrator output can return to normal. The next transition is a function of the data bit value. Thus, by detecting which one-shot is pulsed, the value of the data bit is determined. The multivibrator outputs, Q1 and Q0, are connected to the set and reset inputs, respectively, of a flip-flop 13 for this purpose. The output of flip-flop 13 is the NRZ-L representation of the data contained within the input signal. This process results in a one-half carrier period delay in the formulation of the NRZ-L signal. The demodulator should theoretically tolerate up to ±25% jitter or frequency variation in the carrier before the multivibrators make incorrect indications. Any jitter or frequency variation in the carrier will be reflected to some degree in the demodulator output.

To generate the clock to go with the NRZ-L data, a binary counter 17 is used. The modulus of the counter is selected to be the number $2^N$ of carrier cycles within a PCM bit period. This use of a binary counter requires the carrier to be a $2^N$ multiple of the bit rate. If NRZ-L is all that is required from the demodulator, the $2^N$ restriction can be removed. The multivibrator outputs Q0 and Q1 are "OR"ed together by a gate 14 to produce the clock CCK for the counter. This clock period is the same as that of the carrier. Since the counter performs a divide by $2^N$ function, the Nth output QN of the counter is the bit rate clock BTCK. In order to synchronize the counter (bite rate clock) to the NRZ-L bit edges, a reset pulse (RST) is generated at every "one-zero" bit transition. A flip-flop 15 is used to create an NRZ-L signal delayed by the one-shot pulse width. This delayed NRZ-L signal QA is "AND"ed with the inverse of NRZ-L by a gate 16 to provide the reset pulse RST for counter 17.

To convert the NRZ-L and bit rate clock BTCK to Bi$\phi$-L data, "AND" gates 18 and 20, an inverter 19 and an "OR" gate 21 are used. The bit clock BTCK and the inverted NRZ-L are applied to gate 18 and the BTCK is inverted by inverter 19 and then applied to gate 20 along with the NRZ-L. The outputs of gates 18 and 20 are applied to "OR" gate 21 which produces Bi$\phi$-L* data. Since this technique may create glitches at the bit edges, a flip-flop 22 is included prior to output. The $Q_{N-1}$ output stage of counter 17 is used to clock flip-flop 22. This produces an additional one-fourth bit delay in the deglitched Bi$\phi$-L output.

Figure 2:
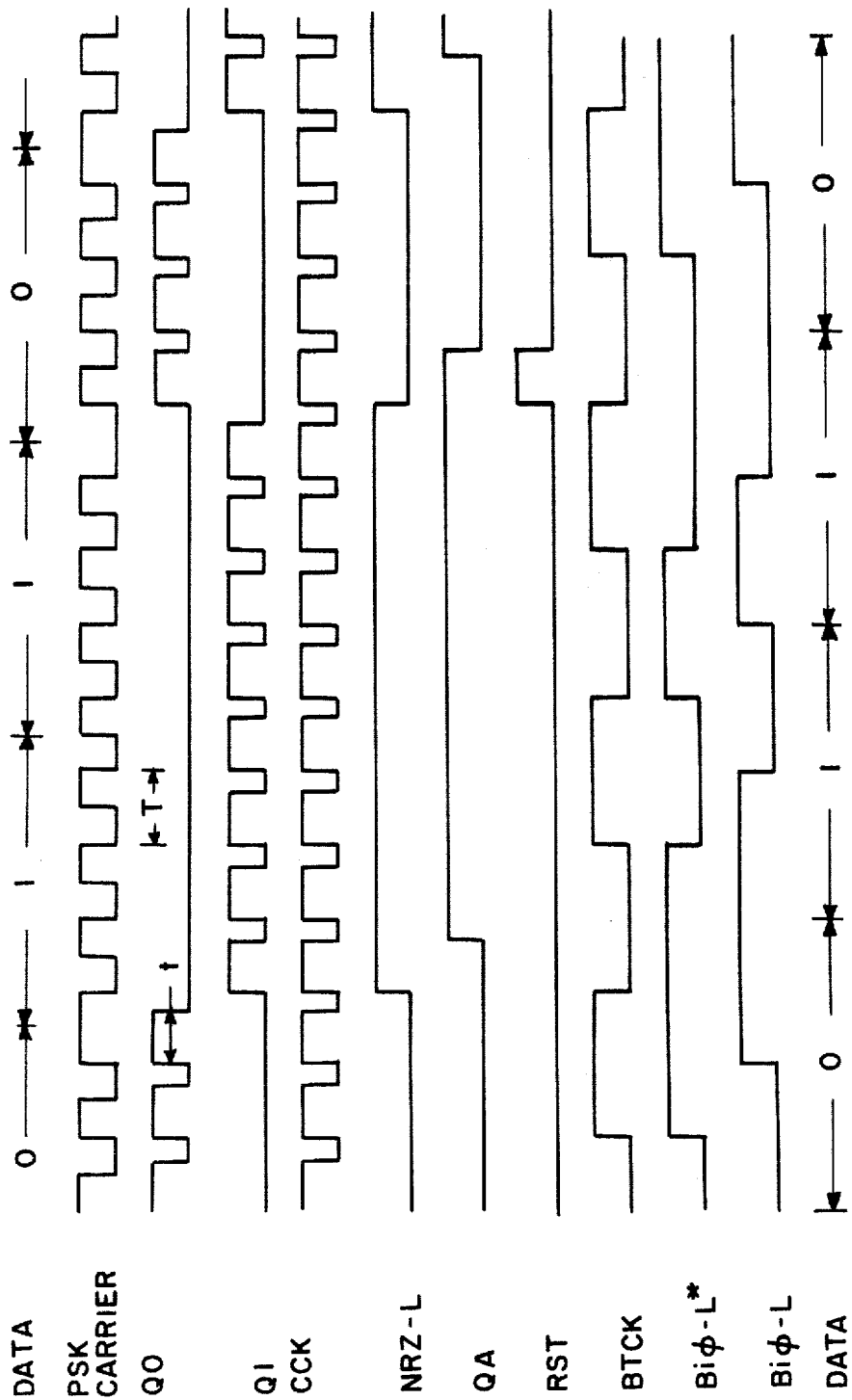
FIG. 2 is the wave forms for the embodiment of the invention shown in FIG. 1 in which the carrier is four ($2^2$) times the bit rate.

Referring to FIG. 2 there is shown the wave forms for the embodiment of the invention in FIG. 1, where the carrier is four ($2^2$) times the bit rate. As is shown at the top of FIG. 2, the data that is transmitted for purposes of illustration is the binary number 0110. The period for the PSK carrier that is supplied to the two multivibrators is T and it requires four cycles of the carrier to transmit one bit of binary information. The output Q0 of multivibrator 11 is a series of four pulses each having a duration $t = \frac{3}{4}T$ while the binary bit "0" is being transmitted; and the output Q1 of multivibrator 12 is a series of four pulses while the binary bit "1" is being transmitted. These outputs Q0 and Q1 are "OR"ed together to form the CCK clock pulses. These outputs Q0 and Q1 of the multivibrators are also applied to the reset and set inputs, respectively, of flip-flop 13 to produce the NRZ-L data. The NRZ-L data is applied to the flip-flop 15 to produce the QA data which is the NRZ-L data delayed by one of the CCK pulses. The inverted NRZ-L data is "AND"ed with the QA data to produce the RST signal. The CCK clock pulses and the reset pulses from the "AND" gate 16 are applied to the binary counter 17 to produce the BTCK clock pulses at the Nth stage of the counter. The NRZ-L data and the BTCK pulses are combined with the remaining logic circuitry to produce the Biφ-L data. It is noted that this Biφ-L data carries the same binary information, 0110, with it that is carried by the PSK input data.

The advantages of this invention are that it is a simple, inexpensive demodulator circuit, that can be constructed using standard digital integrated circuits, for converting PCM data from PSK to NRZ-L or Biφ-L.

Various changes can be made without departing from the spirit or scope of the invention. For example, different carrier and bit rates can be accommodated by changing the component values within the demodulator. A ±20% jitter or frequency variation in the carrier can be tolerated before the demodulator loses synchronization. The invention is disclosed as being built for handling digital inputs but it could be used for sinusoidal inputs with the inclusion of a wave-shaping circuit at the input.

What is claimed as new and desired to be secured by Letters Patent of the United States is:

1. A digital demodulator for converting PCM data from a $2^N$ bit rate carrier PSK signal to Biφ-L comprising:

means receiving the PSK signals for generating NRZ-L data signals and bit clock signals; and
   means responsive to said NRZ-L signals and said bit clock signals for generating Biφ-L signals at a bit rate $1/2^N$ times the PSK rate;
   wherein said means for generating said NRZ-L data signals comprises:
   a first one-shot multivibrator that is activated on the leading edges of pulses applied to it, connected to receive said PSK signals;
   a second one-shot multivibrator, that is activated on the following edges of pulses applied to it, connected to receive said PSK signals;
   a flip-flop having its reset input connected to the normal output of said first one-shot multivibrator and having its set input connected to the normal output of said second one-shot multivibrators; and
   the inverted outputs of said first and second one-shot multivibrators connected to the reset input of the second and first one-shot multivibrators, respectively, whereby the normal output of the flip-flop is said NRZ-L data signals.

2. A digital demodulator according to claim 1 wherein means are connected to receive the normal outputs of said first and second one-shot multivibrators for generating said bit clock signals.

3. A digital demodulator according to claim 2 wherein said means for generating said bit clock signals comprises:
   a binary counter;
   an OR gate connected to receive the normal outputs from said first and second one-shot multivibrators;
   a second flip-flop with its data input connected to the normal output of said first flip-flop and with its clock input connected to the output of said OR gate;
   an AND gate with its inputs connected to the normal output of said second flip-flop and to the inverted output of said first flip-flop; and
   a counter with its input connected to the output of said OR gate and with its reset connected to the output of said AND gate whereby the output of the Nth stage of said counter is said bit clock signals.

4. A digital demodulator according to claim 3 wherein said means for generating Biφ-L signals includes:
   a second AND gate with its inputs connected to the inverted output of said first flip-flop and to the output of the Nth stage of said counter;
   an inverter for inverting the output of the Nth stage of said counter;
   a third AND gate with its inputs connected to the normal output of said first flip-flop and the inverted output of the Nth stage of said counter; and
   a second OR gate with its two inputs connected to the outputs of said second and third AND gates whereby the output of said second OR gate is the Biφ-L signals.

5. A digital demodulator according to claim 4 wherein said means for generating Biφ-L signals further includes:
   a third flip-flop with its data input connected to the output of said second OR gate and with its clock input connected to the output of the (N-1)the stage of said counter whereby the normal output of said third flip-flop is the Biφ-L signals.

6. A digital demodulator for converting PCM data from PSK signals to NRZ-L signals and bit clock signals comprising:
   a first one-shot multivibrator that is activated on the leading edges of pulses applied to it, connected to receive said PSK signals;
   a second one-shot multivibrator that is activated on the following edges of pulses applied to it, connected to receive said PSK signals;
   the inverted outputs of said first and second one-shot multivibrators connected to the reset inputs of the second and first one-shot multivibrators, respectively;
   a flip-flop having its reset and set inputs connected to the normal outputs of said first and second one-shot multivibrators, respectively; whereby the normal output of said flip-flop is the NRZ-L signals; and
   means connected to the outputs of said first and second one-shot multivibrator and said flip-flop for generating said bit clock signals.

7. A digital demodulator according to claim 6 wherein said means for generating said bit clock signals comprise:
   an OR gate with its inputs connected to the normal outputs of said first and second one-shot multivibrators;

a second flip-flop with its data input connected to the normal output of the first flip-flop and with its clock input connected to the output of said OR gate;

an AND gate with its inputs connected to the normal output of said second flip-flop and to the inverted output of the first flip-flop; and a counter with its inputs connected to the outputs of said AND and OR gates whereby the output of the Nth stage of said counter is said bit clock signals.

* * * * *